United States Patent [19]

Halverson

[11] 4,342,653

[45] Aug. 3, 1982

[54] PROCESS FOR THE FLOCCULATION OF SUSPENDED SOLIDS

[75] Inventor: Frederick Halverson, Stamford, Conn.

[73] Assignee: American Cyanamid Company, Stamford, Conn.

[21] Appl. No.: 216,891

[22] Filed: Dec. 16, 1980

Related U.S. Application Data

[63] Continuation-in-part of Ser. No. 156,145, Jun. 3, 1980, abandoned, which is a continuation-in-part of Ser. No. 12,274, Feb. 15, 1979, abandoned.

[51] Int. Cl.$^3$ ................................................ C02F 1/56
[52] U.S. Cl. .................................... 210/734; 210/907; 210/912
[58] Field of Search ................ 210/733, 734, 407, 912

[56] References Cited

U.S. PATENT DOCUMENTS

3,418,237  12/1968  Booth et al. .................... 210/907 X

*Primary Examiner*—Thomas G. Wyse
*Attorney, Agent, or Firm*—Alphonse R. Noë

[57] ABSTRACT

Aqueous dispersions of solids are readily flocculated with polymeric anionic flocculants containing comonomers of 2-acrylamido-2-methylpropanesulfonic acid and acrylamide. The polymeric flocculant should contain from about 1.0 to about 35.0 mole percent of repeating units derived from 2-acrylamido-2-methylpropanesulfonic acid and should have a Brookfield viscosity of at least 2.0 centipoises. In addition to their flocculating ability, employment of these copolymers achieves a high degree of compaction in the flocculated solids.

6 Claims, No Drawings

PROCESS FOR THE FLOCCULATION OF SUSPENDED SOLIDS

CROSS-REFERENCE TO RELATED CASES

This application is a continuation-in-part application of application Ser. No. 156,145 filed June 3, 1980, abandoned, which, in turn, is a continuation-in-part application of application Ser. No. 012,274 filed Feb. 15, 1979, abandoned.

BACKGROUND OF THE INVENTION

This invention relates to an improved process for flocculating suspensions of solids. More particularly, this invention relates to such a process wherein the flocculant employed is an anionic copolymer comprising comonomers of 2-acrylamido-2-methylpropanesulfonic acid and acrylamide.

Flocculants are reagents which are added to suspensions of solids to cause the solids to floc and settle. A highly effective type of flocculant is the polymeric type since this type can be prepared in numerous variations. Typically, polymeric flocculants are of three types, nonionic, cationic, and anionic. The particular type of flocculant to be used in a given application will generally depend upon the nature of the surface of the suspended solids.

To provide nonionic polymers, nonionic monomers such as acrylamide are polymerized under conditions which lead to a nonionic polymer. Polymers containing amine groups, primary, secondary, tertiary, and quaternary types provide typical cationic flocculants with increased charge increasing in the order given. For anionic polymers, carboxylic acid groups are introduced into the polymer. Polymers containing sulfonic acid groups were also introduced as anionic flocculants.

Water-soluble sulfonate polymers have, however, been known in the art as effective flocculants. U.S. Pat. No. 3,692,673 to Hoke teaches the use of polymers of acrylamido sulfonic acids and their salts as useful flocculants for aqueous systems, especially in combination with inorganic flocculants. Similarly, U.S. Pat. No. 3,617,572 to Monagle teaches the use of copolymers of acrylamide and an alkali metal salt of vinyl sulfonic acid as effective flocculants. Despite these teachings, there continues to exist the need for improved processes for flocculating solid suspensions. The provision for such processes would constitute yet another significant advance in the art.

SUMMARY OF THE INVENTION

The present invention provides a process for flocculating suspended solids. The process comprises adding to an aqueous suspension of solids an effective amount of a polymeric anionic flocculant wherein the polymeric anionic flocculant comprises from about 40 to about 99 mole percent of repeating units derived from acrylamide, from about 1 to about 35 mole percent of repeating units derived from 2-acrylamido-2-methylpropanesulfonic acid, and from 0 to about 25 mole percent of repeating units derived from acrylic acid, and wherein the polymeric anionic flocculant has a Brookfield viscosity of at least about 2.0 centipoises.

The process of the present invention provides for rapid flocculation of the suspended solids. With respect to prior art, the instant process recognizes the criticality of its process parameters thereby achieving surprisingly better results over that believed to be possible. In aqeous suspensions of solids containing multivalent cations the flocculation of the solids using the instant process is markedly improved over that achieved with anionic flocculants deriving their anionicity solely from carboxylic acid groups. Finally, the process of the present invention provides unexpectedly for a higher degree of compaction of the flocculated solids than can be achieved with processes employing anionic flocculants deriving their anionicity solely from carboxylic acid groups.

DETAILED DESCRIPTION OF THE INVENTION

In accordance with the present invention there is provided a process for flocculating suspended solids. Although it is believed that the advantages of the instant invention will be demonstrated on all types of solid suspensions, the instant process will be particularly effective on aqueous solid suspensions wherein the solids are phosphate slimes, tar sands, saponites, humate wastes, coal refuse, mineral tailings such as copper tailings, the residue from leach liquors such as are generated in uranium or copper leaching and the like.

The flocculant to be used in the instant process is an anionic polymeric flocculant comprising from about 40 to about 99 mole percent of repeating units derived from acrylamide, from about 1 to about 35 mole percent of repeating units derived from 2-acrylamido-2-methylpropanesulfonic acid, and from 0 to about 25 mole percent of repeating units derived from acrylic acid. Preferably the polymer is a copolymer of acrylamide and 2-acrylamido-2-methylpropanesulfonic acid, more preferably it is such a copolymer having from about 3 to 15 mole percent of repeating units derived from 2-acrylamido-2-methylpropanesulfonic acid.

The anionic polymeric flocculant used in the instant process must have a Brookfield viscosity of at least about 2.0 centipoises, preferably at least 3.30 centipoises. Brookfield viscosity is the viscosity of a 0.08% solution of the polymer in 1 normal NaCl at 25° C. with pH adjusted to 8.5 determined with a Brookfield viscometer using the UL adapter and the spindle rotating at 60 rpm.

To flocculate the solids in these aqueous suspensions, an effective amount of the specified anionic flocculant is added to the suspension. This addition is generally made in a manner which provides uniform distribution of the flocculant throughout the suspension so as to obtain maximum flocculation of solids. Mixing may be an added operation or may be inherent in processing, such as addition to a moving stream of suspension en route to a settling tank. An effective amount of flocculant is that amount which produces the desired level of flocculation and will vary widely depending upon many factors such as the nature of the suspension, the specific flocculant employed, the extent of flocculation or settling rate desired, and the like. Generally, the amount of flocculant will follow conventional dosages except that the present invention allows for reductions in such dosages in appropriate instances. Usually a dosage of about 0.01 to 1.0 milligram of flocculant per liter of suspension will be effective.

It is additionally recognized that the unhindered settling of the flocs so formed only occurs in the uppermost portion of a thickener bed or settling tank. In the lower portion of the bed or tank, the weight of the flocculated material settling above acts to compact the settled flocs below so as to produce an underflow of flocculated material with a solids content considerably higher than the original flocculating suspension. When the underflow of such a bed or tank is transferred to a landfill for permanent disposal, the weight of the overburden causes additional compaction of the flocculated material. The copolymers and/or terpolymers used in the instant process have surprisingly been found, when used in the flocculation process of the instant invention, to exhibit a unique ability to promote compaction of the flocculated solids as compared with other anionic flocculants such as acrylamide-acrylic acid copolymers.

In certain aqueous solid suspensions there is present in the aqueous system a high content of multivalent cations. These multivalent cations have been found to hinder the effectiveness of many prior art flocculants, especially of the anionic nature. The process of the instant invention has proven exceptionally effective against these multivalent cation containing aqueous suspensions of solids. Suspensions containing $Ca^{+2}$, $Al^{+3}$, $Fe^{+3}$, $Fe^{+2}$, $Mg^{+2}$, and the like have been found to be effectively treated. Examples of such suspensions include phosphate slimes, saponites found in kimberlite clay slimes and humate wastes treated with alum or ferrous sulfate.

Whereas the exact scope of the instant invention is set forth in the appended claims, the following specific examples illustrate certain aspects of the present invention, and more particularly, point out methods of evaluating the same. However, the examples are set forth for illustration only and are not to be construed as limitations on the present invention except as set forth in the appended claims. All parts and percentages are by weight unless otherwise specified.

PHOSPHATE SLIMES SETTLING TEST

Florida phosphate slimes are adjusted to a solids level of 1.0% with water and 1000 ml. of the resulting suspension are placed in a one-liter graduated cylinder. The desired weight of polymer flocculant is prepared as a solution in 50 ml. deionized water. This flocculant solution is admixed with the slimes in the cylinder with agitation to ensure thorough mixing of slimes with flocculant, the agitator is removed, and time during which the solids/liquid level settles from the 1000 ml. mark to the 800 ml. mark is recorded. The distance between these two marks varies between cylinders, but in the set for these experiments, it is 7.20±0.08 cm. Average rate of settling over this distance is given in units of cm./sec.

COLOR REMOVAL

Test Procedure

A Phipps-Bird six place gang stirrer, equipped with $\frac{3}{4}"\times1\frac{3}{4}"$ paddles, was used for jar tests. Five hundred milliliters of the water to be treated were added to each of six 600 ml. beakers and placed on the stirrer. With the paddles rotating in the water at 150 rpm, a specified amount of alum (as a 1% solution) was added to each beaker, the additions being as near to simultaneous as possible. Stirring at 150 rpm was continued for 30 seconds after alum addition, then was reduced to 40 rpm. At the end of 3 minutes stirring was increased to 150 rpm, and the high molecular weight anionic polymer was added to each beaker as a solution in 30 ml. deionized water. Stirring at 150 rpm was continued for 30 seconds, then reduced to 40 rpm for 3 minutes, at which time stirring was stopped and paddles were raised out of the beakers.

Floc size was estimated during the latter part of the stirring period, on a scale of 1 to 10, with 1 representing flocs smaller than 0.5 mm., and 10 representing flocs 1 cm or larger. The contents of the six beakers in a set (those being treated simultaneously) were compared visually in terms of rate of settling of flocs, and ranked from 1 to 6, with 1 being the most rapid in the set. Residual soluble color was monitored by removing supernatant from each beaker at the end of five minutes, and measuring the optical density of a 4 cm path. Solution color removal is determined primarily by the precipitation with aluminum, rather than by anionic flocculant addition, and so does not vary much for a fixed alum addition.

HUMATE WASTES-SETTLING TEST No. 1

Seven hundred milliliters of humate wastes are placed in a 1 liter graduated cylinder. Fifty milliliters of 1% $FeSO_4.7H_2O$ solution are diluted to 150 milliliters total volume, and then added to the graduated cylinder with agitation to insure uniform mixing. The polymeric flocculant then is added to the cylinder as a solution in 150 ml of deionized water, with mixing to provide adequate dispersion of the polymer solution throughout the suspension for about 5-10 seconds. Following addition of the polymeric flocculant, very mild agitation is provided by three $\frac{1}{8}"$ diameter stainless steel fingers positioned equidistantly along the circumference of a circle with a radius about one half the internal radius of the cylinder, extending from the top to bottom of the cylinder, and moved along the path of the circle at a rate of one revolution per minute. The height of the solids/liquid interface is recorded as a function of time after addition of polymeric flocculant.

HUMATE WASTES-SETTLING TEST No. 2

Seven hundred milliliters of humate wastes are placed in a 1 liter graduated cylinder. The pH is adjusted to 7.0 with 0.5 N NaOH. Fifty milliliters of 1% $FeSO_4.7H_2O$ solution are diluted with deionized water, in an amount necessary to provide a total volume of 850 ml of the graduated cylinder when added to the humate wastes. This ferrous sulfate solution is added to the cylinder with agitation to insure thorough mixing. A solution containing 5 mg polymeric flocculant in 150 ml deionized water then is added slowly to the cylinder (over about 10-15 seconds), with agitation to provide thorough mixing of flocculant with the suspension. Following addition of the polymeric flocculant, very mild agitation is provided by three $\frac{1}{8}"$ diameter stainless steel fingers extending from top to bottom of the cylinder, and traversing a cylindrical path in the cylinder with a radius about one half the radius of the cylinder. Each finger completes one traversal along the periphery of the circle per second. The height of the solids/liquid interface is recorded as a function of time after addition of flocculant. The rate of settling is computed from the number of minutes required for the interface to settle one centimeter below the 1000 ml mark on the graduated cylinder.

EXAMPLES 1 AND 2

Following the Settling Test procedure, rates of settling at pH 7.5 as a function of flocculant dosage (mg polymer/g dry slime solids) over a commercially viable range were determined and the results are given in Table I which follows which also indicates the polymer composition and Brookfield viscosity.

TABLE I

SETTLING RATES OF FLORIDA PHOSPHATE SLIMES

| | | Example 1 | Example 2 | Comp. A | Comp. B |
|---|---|---|---|---|---|
| Polymer Composition (Mole %) | | | | | |
| Acrylamidomethylpropane-sulfonic acid [1] | | 15 | 7 | 0 | 0 |
| Acrylic Acid [1] | | 0 | 0 | 12 | 7 |
| Acrylamide | | 85 | 93 | 88 | 93 |
| Brookfield Viscosity (cps.) | | 3.3 | 3.4 | 3.9 | 3.4 |
| | | Settling Rates cm/sec. | | | |
| Dosage mg/g | 0.025 | 0.045 | — | — | — |
| | 0.050 | 0.140 | 0.062 | — | — |
| | 0.075 | 0.200 | 0.105 | — | — |
| | 0.100 | 0.270 | 0.160 | 0.072 | — |
| | 0.125 | — | 0.205 | 0.100 | — |
| | 0.150 | — | — | 0.135 | 0.115 |
| | 0.175 | — | — | 0.195 | 0.135 |
| | 0.200 | — | — | — | 0.165 |
| | 0.225 | — | — | — | 0.195 |

[1] As sodium salt.

The results given in Table I above indicate the superior settling rates achieved at lower polymer dosages using polymers containing ionicity derived from sulfonate groups.

EXAMPLES 3-6

Comparisons in performance can be made via dosages necessary to achieve a fixed settling rate from plots of the settling rate at various polymer dosages. Using this procedure, the polymer dosage required to provide a settling rate of 0.144 cm./sec. (17 ft./hr.) was determined using the same slimes as in Examples 1 and 2. The dosage value (D) is given below in Table II along with polymer compositions and Brookfield viscosities.

TABLE II

D VALUES FOR VARIOUS POLYMERS FOR FLOCCULATING FLORIDA PHOSPHATE SLIMES

| | EXAMPLE | | | | Comparative | | | |
|---|---|---|---|---|---|---|---|---|
| | 3 | 4 | 5 | 6 | C | D | E | F |
| Polymer Composition (Mole %) | | | | | | | | |
| Acrylamidomethylpropane-sulfonic acid | 5 | 15 | 7 | 5 | — | — | — | — |
| Acrylic Acid | — | — | — | — | 3.5 | 15 | 7.7 | 4 |
| Acrylamide | 95 | 85 | 93 | 95 | 96.5 | 85 | 92.3 | 96 |
| Brookfield Viscosity (cps) | 3.6 | 4.0 | 4.7 | 4.8 | 3.5 | 4.6 | 4.4 | 4.2 |
| Dosage mg/g for settling rate = 0.144 cm/sec. | 0.135 | 0.040 | 0.090 | 0.130 | 0.208 | 0.123 | 0.180 | 0.213 |

EXAMPLE 7

Using phosphate slimes obtained from another source, settling tests to determine the dosage requirements for a settling rate of 0.144 cm./sec. were determined operating at pH=7.85. The polymers employed and the dosage requirements are given in Table III which follows.

TABLE III

DOSAGE REQUIREMENTS FOR SETTLING OF FLORIDA PHOSPHATE SLIMES

| | Example 7 | Comp. G |
|---|---|---|
| Polymer Composition (Mole %) | | |
| Acrylamidomethylpropane-sulfonic acid | 4 | — |
| Acrylic Acid | 2 | 7 |
| Acrylamide | 94 | 93 |
| Brookfield Viscosity (cps) | 3.4 | 3.4 |
| Dosage for 0.114 cm./sec. settling rate (mg/g) | 0.125 | 0.310 |

EXAMPLES 8-10

Using the color removal procedure described above, the effluent tested was a deep amber colored suspension with low solids from a paper mill in North Carolina. The suspension pH was adjusted from 7.8 to 6.5 with sulfuric acid. Alum addition was at a level of 350 ppm. A series of tests were run with aliquots of the suspension using flocculants at various dosages. The flocculant of Examples 8-10 contained 7 mole percent acrylamidomethylpropanesulfonic acid and 93 mole percent acrylamide. The Comparative Flocculant G contained 7 mole percent acrylic acid and 93 mole percent acrylamide. Details and results are given in Table IV.

TABLE IV

COLOR REMOVAL USING ALUM FOLLOWED BY FLOCCULATION

| Example | Flocculant Brookfield Viscosity (cps) | Dosage (Mg/l) | Floc Size | Performance Rank |
|---|---|---|---|---|
| 8 | 3.4 | 0.1 | 3 | 3 |
| 9 | 3.4 | 0.2 | 5 | 2 |
| 10 | 3.4 | 0.3 | 6 | 1 |
| G, run 1 | 3.4 | 0.1 | 2 | 6 |
| G, run 2 | 3.4 | 0.2 | 2 | 5 |
| G, run 3 | 3.4 | 0.3 | 2 | 4 |

Thus, 0.1 mg/l of the flocculant of the invention provides more rapid clarification than 0.3 mg./l of the comparative flocculant.

EXAMPLES 11-13

The procedure of Examples 8-10 was repeated in every material detail except for the flocculants employed. The flocculant of Examples 11-13 contained 5 mole percent acrylamidomethylpropanesulfonic acid and 95 mole percent acrylamide. The Comparative Flocculant H contained 3.5 percent acrylic acid and 96.5 percent acrylamide. Details and results are given in Table V.

TABLE V
COLOR REMOVAL USING ALUM FOLLOWED BY FLOCCULATION

| Example | Flocculant Brookfield Viscosity (cps) | Dosage (Mg/l) | Floc Size | Performance Rank |
|---|---|---|---|---|
| 11 | 3.6 | 0.1 | 5 | 3 |
| 12 | 3.6 | 0.2 | 6 | 2 |
| 13 | 3.6 | 0.3 | 7 | 1 |
| H, run 1 | 3.5 | 0.1 | 3 | 6 |
| H, run 2 | 3.5 | 0.2 | 4 | 5 |
| H, run 3 | 3.5 | 0.3 | 4 | 4 |

Again, 0.1 mg/l of the flocculant of the invention provides more rapid clarification than 0.3 mg/l of the comparative flocculant.

EXAMPLES 14–16

Again repeating the procedure of Examples 8–10 in every material detail, two additional flocculants were evaluated. The flocculant of the invention contained 15 mole percent acrylamidomethylpropanesulfonic acid and 85 mole percent acrylamide. The Comparative Flocculant I contained 12 mole percent acrylic acid and 88 percent acrylamide. Details and results are given in Table VI.

TABLE VI
COLOR REMOVAL USING ALUM FOLLOWED BY FLOCCULATION

| Example | Flocculant Brookfield Viscosity (cps) | Dosage (Mg/l) | Floc Size | Performance Rank |
|---|---|---|---|---|
| 14 | 3.3 | 0.1 | 2 | 3 |
| 15 | 3.3 | 0.2 | 3 | 2 |
| 16 | 3.3 | 0.3 | 4 | 1 |
| I, run 1 | 3.9 | 0.1 | 1 | 5 |
| I, run 2 | 3.9 | 0.2 | 1 | 6 |
| I, run 3 | 3.9 | 0.3 | 1 | 4 |

EXAMPLES 17–19

Again repeating the procedure of Examples 8–10 in every material detail, two additional flocculants were evaluated. The flocculant of Examples 14–16 contained 15 mole percent acrylamidomethylpropanesulfonic acid and 85 mole percent acrylamide. The Comparative Flocculant J contained 15 mole percent acrylic acid and 85 mole percent acrylamide. Details and results are given in Table VII.

TABLE VII
COLOR REMOVAL USING ALUM FOLLOWED BY FLOCCULATION

| Example | Flocculant Brookfield Viscosity (cps) | Dosage (Mg/l) | Floc Size | Performance Rank |
|---|---|---|---|---|
| 17 | 4.0 | 0.1 | 4 | 3 |
| 18 | 4.0 | 0.2 | 5 | 2 |
| 19 | 4.0 | 0.3 | 7 | 1 |
| J, run 1 | 4.6 | 0.1 | 1 | 6 |
| J, run 2 | 4.6 | 0.2 | 1 | 5 |
| J, run 3 | 4.6 | 0.3 | 1 | 4 |

EXAMPLES 20–22

Again following the procedure of Examples 8–10 in every material detail, two additional flocculants were evaluated. The flocculant of Examples 0–22 contained 7 mole percent acrylamidomethylpropanesulfonic acid and 93 mole percent acrylamide. The Comparative Flocculant K contained 7.7 mole percent acrylic acid and 92.3 mole percent acrylamide. Details and results are given in Table VIII.

TABLE VIII
COLOR REMOVAL USING ALUM FOLLOWED BY FLOCCULATION

| Example | Flocculant Brookfield Viscosity (cps) | Dosage (Mg/l) | Floc Size | Performance Rank |
|---|---|---|---|---|
| 20 | 4.7 | 0.1 | 4 | 3 |
| 21 | 4.7 | 0.2 | 5 | 2 |
| 22 | 4.7 | 0.3 | 6 | 1 |
| K, run 1 | 4.4 | 0.1 | 2 | 6 |
| K, run 2 | 4.4 | 0.2 | 2 | 5 |
| K, run 3 | 4.4 | 0.3 | 2 | 4 |

EXAMPLES 23–25

Again following the procedure of Examples 8–10 in every material detail, two additional flocculants were evaluated. The flocculant of Examples 23–25 contained 5 mole percent acrylamidomethylpropanesulfonic acid and 95 mole percent acrylamide. The Comparative Flocculant L contained 4 mole percent acrylic acid and 96 mole percent acrylamide. Details and results are given in Table IX.

TABLE IX
COLOR REMOVAL USING ALUM FOLLOWED BY FLOCCULATION

| Example | Flocculant Brookfield Viscosity (cps) | Dosage (Mg/l) | Floc Size | Performance Rank |
|---|---|---|---|---|
| 23 | 4.8 | 0.1 | 5 | 3 |
| 24 | 4.8 | 0.2 | 8 | 2 |
| 25 | 4.8 | 0.3 | 9 | 1 |
| L, run 1 | 4.2 | 0.1 | 1 | 6 |
| L, run 2 | 4.2 | 0.2 | 2 | 5 |
| L, run 3 | 4.2 | 0.3 | 2 | 4 |

EXAMPLE 26

Following the Humate Wastes-Settling Test No. 1, humate wastes from effluent stream to settling pond 20 grams solids per kilogram of substrate and pH 5.9 were treated with two flocculants in separate runs. Details and results are given below.

TABLE X
SETTLING RATES OF HUMATE WASTES

| Polymer Composition (Mole %) | Example 26 | Comparative Example M |
|---|---|---|
| Acrylamidomethylpropanesulfonic acid [1] (AMPS) | 7 | 0 |
| Acrylic Acid [1] (AA) | 0 | 7.7 |
| Acrylamide (AM) | 93 | 92.3 |
| Brookfield Viscosity | 4.7 | 4.4 |

Note
[1] As sodium salt

The polymer of Example 26 provided an average settling rate of 0.24 centimeter per minute over 7.2 centimeters at a dosage of 0.36 milligrams polymer per gram of solids. For the same settling rate, the polymer of Comparative Example M required a dosage of 5 milligrams of polymer per gram of solids.

EXAMPLE 27

Following the procedure of Example 26, two additional polymers were evaluated. Details and results are given below.

TABLE XI
SETTLING RATES OF HUMATE WASTES

| Polymer Composition (Mole %) | Example 27 | Comparative Example N |
|---|---|---|
| AMPS [1] | 15 | 0 |
| AA [1] | 0 | 15 |
| AM | 85 | 85 |
| Brookfield Viscosity | 4.0 | 4.6 |

For a settling rate as in Example 26, 0.36 mg/gram solids of the polymer of Example 27 was required. For the same settling rate, 5 mg/gram solids of the polymer of Comparative Example N was required.

EXAMPLE 28

Again following the procedure of Example 26, two additional flocculants were evaluated. Details and results are given below.

TABLE XII
SETTLING RATES OF HUMATE WASTES

| Polymer Composition (Mole %) | Example 28 | Comparative Example O |
|---|---|---|
| AMPS [1] | 5 | 0 |
| AA [1] | 0 | 3.5 |
| AM | 95 | 86.5 |
| Brookfield Viscosity | 3.6 | 3.5 |

For a settling rate as in Example 26, the dosage required for the polymer of Comparative Example 0 was four times that required for the polymer of Example 28.

EXAMPLES 29–32

The procedure of Humate Wastes-Settling Test No. 2 was followed using eight polymer flocculants in separate runs, four of the invention and four comparative. Details and results are given below.

TABLE XIII
HUMATE WASTES-SETTLING RATES

| Polymer Comp. (Mole %) | EXAMPLES | | | | Comparative Examples | | | |
|---|---|---|---|---|---|---|---|---|
| | 29 | 30 | 31 | 32 | P | Q | R | S |
| AMPS [1] | 7 | 5 | 15 | 7 | 0 | 0 | 0 | 0 |
| AA [1] | 0 | 0 | 0 | 0 | 7 | 3.5 | 15 | 7.7 |
| AM | 93 | 95 | 85 | 93 | 93 | 96.5 | 85 | 92.3 |
| Brookfield Viscosity | 3.4 | 3.6 | 4.0 | 4.7 | 3.4 | 3.5 | 4.6 | 4.4 |
| Settling Rate (cm/min) | 0.15 | 0.093 | 0.17 | 0.15 | 0.027 | 0.022 | 0.021 | 0.023 |

EXAMPLE 33

A sample of fresh phosphate slimes with a solids content of 1.6% is fed into a 3½ inches scale thickener at a rate of 250 ml/min. A polymer solution is fed in line with the slimes at a rate of 10 ml./min. The floc bed which forms is allowed to build to a depth of 6 inches at which time a photosensor activates an underflow pump which removes flocculated material from the bottom of the bed. This activation and deactivation continues until the thickener reaches a steady state. A sample of the underflow is then taken and analyzed for solids content.

Table XIV sets forth the polymers employed as flocculants and the compactability obtained as a function of the solids content.

TABLE XIV

| Emulsion Dosages (lb/ton) | 0.5 | 0.6 | 0.7 | 0.8 | 0.9 | 1.0 |
|---|---|---|---|---|---|---|
| Emulsion 1 | — | 7.1 | 7.8 | 7.7 | 8.1 | 10.2 |
| Emulsion 2 | 9.5 | 10.3 | 12.0 | — | — | — |
| Emulsion 3 | 7.8 | 9.9 | 10.8 | — | — | — |
| Emulsion 4 | 6.2 | 10.6 | 11.5 | — | — | — |

Emulsion 1 = The emulsion contains 25% polymer, 46% water and 29% oil, emulsifier and breaker. The polymer is a 30 molar percent arylic acid, 70 molar percent acrylamide with a Brookfield viscosity of 5.7.
Emulsion 2 = The emulsion contains 33% polymer, 35% water and 32% oil and emulsifier. The polymer is a 15 molar percent acrylamidomethylpropane sulfonic acid, 85% acrylamide with a Brookfield viscosity of 2.4.
Emulsion 3 = The emulsion contains 30% polymer, 38% water and 32% oil and emulsifier. The polymer is a 10 molar percent acrylamidomethyl propane sulfonic acid, 90% acrylamide with a Brookfield viscosity of 2.5.
Emulsion 4 = The emulsion contains 34% polymer, 34% water, 32% oil and emulsifier. The polymer is a 20 molar percent acrylamidomethylpropane sulfonic acid, 80 molar percent acrylamide with a Brookfield viscosity of 2.5.

EXAMPLE 34

Following the procedure of Example 33 in every material detail except that a dry polymer is employed in place of the emulsion on a 2% solids phosphate slime the results obtained are set forth in Table XV below.

TABLE XV
UNDERFLOW SOLIDS CONTENT

| Polymer Dosage (lb/ton) | .2 | .3 | .4 | .5 | .6 |
|---|---|---|---|---|---|
| Polymer 4 | 3.6 | — | 4.1 | — | 8.4 |
| Polymer 5 | 4.8 | — | 12.8 | — | 12.0 |
| Polymer 6 | 8.1 | — | 12.8 | 12.0 | — |

Polymer 4 = 30 molar percent hydrolyzed polyacrylamide with a Brookfield viscosity of about 4.4.
Polymer 5 = 10 molar percent acrylamidomethyl propane sulfonic acid, 90 molar percent acrylamide with a Brookfield viscosity of about 2.9.
Polymer 6 = 10 molar percent acrylamidomethyl propane sulfonic acid, 80 molar percent acrylamide and 10 molar percent hydrolyzed acrylamide containing carboxylic acid groups with a Brookfield viscosity of about 3.1.

EXAMPLE 35

Following the procedure of Example 33 employing the dry polymers listed below in Table XVI the percent solids underflow content is determined.

TABLE XVI
UNDERFLOW SOLIDS CONTENT

| Polymer Dosage (lb./ton) | 1.95 | 1.0 | 0.4 |
|---|---|---|---|
| Polymer 7 | 14.2 | 13.7 | 10.7 |
| Polymer 8 | 10.0 | — | — |
| Polymer 9 | 13.8 | 12.8 | 4.5 |

TABLE XVI-continued

| UNDERFLOW SOLIDS CONTENT | | | |
|---|---|---|---|
| Polymer Dosage (lb./ton) | 1.95 | 1.0 | 0.4 |
| Polymer 10 | 14.4 | 13.5 | — |

Polymer 7 = 15 molar percent AMPS and 85 molar percent acrylamide with a Brookfield viscosity of 2.6.
Polymer 8 = 15 molar percent AMPS and 85 molar percent acrylamide with a Brookfield viscosity of 1.6.
Polymer 9 = 15 molar percent AMPS and 85 molar percent acrylamide with a Brookfield viscosity of 2.0.
Polymer 10 = 15 molar percent AMPS and 85 molar percent acrylamide with a Brookfield viscosity of 2.4.

EXAMPLE 36

400 Part samples of well mixed coal refuse slurries are weighed into 600 ml beakers. Agitation of the slurry is provided at 250 rpm while 75 ml of an aqueous solution containing sufficient cationic flocculant to provide 0.04 part cationic flocculant per part of suspended solid is added over a 5 second interval. Agitation is then continued for 20 seconds longer after which 75 ml of an aqueous solution containing sufficient anionic flocculant to provide 0.04 part anionic flocculant per part of suspended solid is added over a 5 second period. Agitation is again continued for 20 additional seconds after which the contents are immediately poured into a 500 ml graduated cylinder. The time required for the solids to settle from the 500 ml to the 400 ml mark in the cylinder is measured. Dosage levels of anionic flocculant are determined which provide a settling rate of 0.25 cm/sec. Test results are reported in Table XVII.

TABLE XVII

| Flocculant | Brookfield Viscosity | Dosage Required (mg/g) |
|---|---|---|
| 6% carboxylic 93% acrylamide | 2.6 | 42 |
| 10% carboxylic 90% acrylamide | 3.0 | 30–32 |
| 20% carboxylic 80% acrylamide | 3.3 | 24 |
| 7% AMPS 93% acrylamide | 3.4 | 20 |
| 10% AMPS 90% acrylamide | 2.4 | 25 |
| 15% AMPS 85% acrylamide | 3.3 | 17 |

EXAMPLE 37

Settling tests are conducted on the rougher tailings from a western copper ore processing plant (37% solids, pH=10.5) to determine the dosage required to effect a settling rate of 0.0075 cm/sec. Test results are listed in Table XVIII.

TABLE XVIII

| Copolymer Composition | | | | |
|---|---|---|---|---|
| % Acrylamide | % Acrylic Acid | % AMPS | Brookfield Viscosity | Dosage (mg/kg) |
| 95 | 5 | — | 3.6 | 1.0 |
| 93 | — | 7 | 3.4 | 0.68 |
| 89 | 11 | — | 3.4 | 1.1 |
| 85 | — | 15 | 2.8 | 0.88 |

EXAMPLE 38

A feed slurry of copper tailings having a solids content of 35 to 40% and a pH between 11.0 and 11.5 is fed into a 2000 ml cylinder and rotated on a tumbling device to insure dispersion. Rotation is stopped and the flocculant, diluted with 40 parts of water, is added to the dispersion. The cylinder is again rotated four full turns and the settling rate was determined over a 20 minute period. Test results are set forth in Table XIX.

TABLE XIX

| Flocculant | Dosage (#/ton) | Settling Rate (ft/hr) |
|---|---|---|
| Na salt of a copolymer of 85% acrylamide and 15% AMPS | 0.010 | 0.55 |
| | 0.015 | 0.63 |
| | 0.020 | 0.71 |
| NH4 salt of a copolymer of 85% acrylamide and 15% AMPS | 0.010 | 0.58 |
| | 0.015 | 0.62 |
| | 0.020 | 0.65 |
| Copolymer of 70% acrylamide and 30% acrylic acid | 0.010 | 0.35 |
| | 0.025 | 0.48 |
| | 0.050 | 0.64 |
| Na salt of a copolymer of 85% acrylamide and 15% AMPS | 0.010 | 0.44 |
| | 0.025 | 0.55 |
| | 0.050 | 0.81 |
| Copolymer of 70% acrylamide and 30% acrylic acid | 0.010 | 0.37 |
| | 0.025 | 0.45 |
| | 0.050 | 0.54 |

EXAMPLE 39

Following the procedure of Example 38, a feed slurry to the counter current decantation thickeners of a copper oxide leach circuit having a solids content of 11.0 to 12.0% and a pH between 2.0 and 3.0 is treated with a flocculant and a settling rate determined. Test results are set forth in table XX.

TABLE XX

| Flocculant | Dosage (#/ton) | Settling Rate (Ft/hr) |
|---|---|---|
| Na salt of a copolymer of 85% acrylamide and 15% AMPS | .0060 | 3.0 |
| | .0090 | 3.7 |
| NH4 salt of a copolymer of 85% acrylamide and 15% AMPS | .0060 | 4.0 |
| | .0090 | 4.8 |
| NH4 salt of a copolymer of 85% acrylamide and 15% AMPS | .018 | 10.8 |
| | .027 | 18.0 |
| | .033 | 26.0 |
| High molecular weight nonionic polyacrylamide (emulsion) | .0050 | 2.6 |
| | .0075 | 2.9 |
| High molecular weight nonionic polyacrylamide (dry polymer) | .016 | 4.75 |
| | .026 | 6.25 |
| | .032 | 10.50 |

EXAMPLE 40

Following the procedure of Example 38, a feed slurry of the leach residue from a uranium leaching operation is treated with a flocculant and a settling rate determined. Test results are set forth in Table XXI. The polymers employed are listed in Table XXII.

TABLE XXI

| Flocculant | Dosage ($10^{-3}$ gm/litr/substrate) | Settling rate (ft/hr) |
|---|---|---|
| High molecular weight nonionic polyacrylamide (dry polymer) | 5.9 | 2.8 |
| | 6.8 | 3.2 |
| | 7.6 | 3.8 |
| | 8.5 | 7.6 |
| Dry B | 5.1 | 4.6 |
| | 6.8 | 28.1 |
| Dry D | 3.4 | 3.8 |
| | 5.1 | 23.8 |
| Dry E | 3.4 | 4.7 |
| | 5.1 | 31.7 |
| Dry F | 4.5 | 35.0 |
| Dry G | 4.5 | 13.4 |

TABLE XXI-continued

| Flocculant | Dosage ($10^{-3}$ gm/litr/substrate) | Settling rate (ft/hr) |
|---|---|---|
| Dry H | 5.0 | no floc formation |
| High molecular weight nonionic polyacrylamide (dry polymer) | 7.2 | 3.7 |
| | 7.8 | 9.2 |
| Dry B | 4.3 | 3.6 |
| | 5.1 | 14.0 |
| Emulsion B | 4.6 | 3.9 |
| | 5.6 | 9.9 |
| Dry D | 3.4 | 5.5 |
| | 3.6 | 18.0 |
| | 3.9 | 29.3 |
| Emulsion C | 3.3 | 2.9 |
| | 4.6 | 10.9 |
| | 5.8 | 30.2 |
| High molecular weight non-ionic polyacrylamide (emulsion polymer) | 5.7 | 3.6 |
| | 6.4 | 4.4 |
| | 7.1 | 23.4 |
| High molecular weight non-ionic polyacrylamide (dry polymer) | 8.5 | 2.6 |
| | 9.4 | 11.5 |
| Dry A | 5.4 | 2.5 |
| Dry B | 5.4 | 3.9 |
| Dry C | 6.1 | 2.6 |
| Dry D | 4.1 | 4.0 |

EXAMPLE 41

Following the procedure of Example 38 a feed slurry of a copper leach residue is treated with a flocculant and a settling rate determined. Test results are set forth in Table XXII.

TABLE XXII

| Flocculants Designation | Mole % AMPS | Brookfield Viscosity | % Polymer |
|---|---|---|---|
| Dry A | 5.0 | 2.64 | 85% |
| Dry B | 7.7 | 3.6 | 85% |
| Dry C | 10.0 | 2.32 | 85% |
| Dry D | 15.9 | 3.76 | 85% |
| Dry E | 24.4 | 3.68 | 85% |
| Dry F | 33.5 | 3.76 | 85% |
| Dry G | 43.5 | 3.6 | 85% |
| Dry H | 53.1 | 3.28 | 85% |
| Emulsion A | 10.0 | 2.5 | 28.3% |
| Emulsion B | 15.0 | 2.4 | 31.3% |
| Emulsion C | 20.0 | 2.5 | 33.1% |

EXAMPLE 42

Following the procedure of Example 38 a potash feed slurry is treated with a flocculant and a settling rate determined. Test results are set forth in Table XXIII.

TABLE XXIII

| Flocculant | Dosage ($10^{-2}$ #/ton) | Settling Rate (ft/hr) |
|---|---|---|
| High molecular weight non-ionic polyacrylamide (emulsion polymer) | 3.7 | 5.5 |
| | 4.5 | 23.4 |
| | 4.5 | 25.1 |
| | 5.2 | 34.5 |
| | 6.2 | 34.8 |
| | 8.6 | 39.0 |
| Dry A | 2.5 | 1.0 |
| | 3.5 | 7.8 |
| | 4.7 | 18.5 |
| Dry B | 2.5 | 5.4 |
| | 3.8 | 15.0 |
| | 4.7 | 47.8 |
| Dry C | 2.5 | 1.0 |
| | 4.7 | 30.0 |
| Dry D | 2.2 | 7.4 |
| | 2.5 | 13.4 |
| | 2.6 | 11.5 |
| | 3.1 | 25.1 |
| Dry E | 2.2 | 14.1 |
| | 2.5 | 27.5 |
| | 2.6 | 31.2 |
| | 3.1 | 46.8 |
| Dry F | 2.2 | 10.9 |
| | 2.5 | 27.0 |
| | 2.6 | 28.1 |
| | 3.1 | 49.9 |
| Dry G | 2.5 | 16.6 |
| Dry H | 2.5 | 7.4 |
| Emulsion A | 3.1 | 13.0 |
| | 4.5 | 35.6 |
| Emulsion C | 3.6 | 25.1 |

EXAMPLE 43

Following the procedure of Example 38 a feed slurry of a copper oxide sulfate leach liquor is treated with a flocculant and a settling rate determined. Test results are set forth in Table XXIV below.

TABLE XXIV

| Flocculant | Dosage ($10^{-3}$ gm/ltr substrate) | Settling Rate (ft/hr) |
|---|---|---|
| High molecular weight nonionic polyacrylamide (dry polymer) | 6.8 | 4.9 |
| | 8.5 | 20.0* |
| High molecular weight nonionic polyacrylamide (emulsion polymer) | 10.0 | 13.7 |
| Dry B | 8.5 | 3.9 |
| | 8.5 | 10.0 |
| Dry C | 8.5 | 3.4 |
| Dry D | 6.8 | 3.4 |
| | 8.5 | 5.0 |
| | 8.5 | 20.4* |
| | 8.5 | 4.9 |
| Dry E | 8.5 | <2.0 |
| | 8.5 | 4.8 |
| Dry F | 8.5 | 5.2 |
| Dry G | 8.5 | 6.8 |
| Dry H | 8.5 | <5.0 |
| Emulsion C | 11.6 | 2.7 |

*Test results are suspect

EXAMPLE 44

Following the procedure of Example 38 a feed slurry of a uranium sulfate leach liquor is treated with a flocculant and a settling rate determined. Test results are set forth in Table XXV.

TABLE XXV

| Flocculant | Dosage (15/ton) | Settling Rate (in/min) |
|---|---|---|
| High molecular weight nonionic polyacrylamide (85% polymer, dry) | 0.017 | 0.95 |
| | 0.026 | 1.25 |
| | 0.034 | 2.1 |
| High molecular weight nonionic polyacrylamide (30% polymer, emulsion) | 0.006 | 0.52 |
| | 0.009 | 0.58 |
| Emulsion B (NH4 salt) | 0.006 | 0.80 |
| | 0.009 | 0.96 |
| | 0.018 | 2.0 |
| | 0.027 | 3.6 |
| | 0.033 | 5.2 |
| Emulsion B (Na salt) | 0.006 | 0.60 |
| | 0.009 | 0.74 |

TABLE XXVI

| Flocculant | Dosage (lb/ton) | Settling Rate (in/hr) |
|---|---|---|
| High molecular weight | 0.40 | 0.36 |
| nonionic polyacrylamide | 0.55 | 0.58 |
| (30% polymer, emulsion) | | |
| Emulsion A | 0.25 | 0.31 |
| (28% polymer, emulsion) | 0.40 | 0.61 |
| Emulsion C | 0.25 | 1.32 |
| (33% polymer, emulsion) | 0.40 | 9.78 |

EXAMPLE 45

1000 Ml of Florida phosphate slime with a solids content adjusted to 0.7% was mixed with 50 ml of flocculant solution by allowing both to flow by gravity into a 1000 ml graduate through the same glass tube. The average settling rate was measured as in previous examples between the 1000 and 800 ml marks (7.2 cm). The results are set forth in Table XXVII below.

TABLE XXVII

| Polymer | Dose (lb/ton) | Settling Rate (cm/sec) |
|---|---|---|
| Polymer A | .31 | .143 |
|  | .46 | .230 |
|  | .62 | .301 |
| Polymer B | .31 | .216 |
|  | .46 | .275 |
|  | .62 | .331 |
| Polymer C | .50 | .107 |
|  | .62 | .175 |
|  | .75 | .330 |
| Polymer D | .35 | .128 |
|  | .45 | .194 |
|  | .50 | .260 |

Polymer A is a 15% AMPS, 20% acrylic acid, 65% acrylamide terpolymer (30.9% polymer emulsion) with a Brookfield viscosity of 3.6 cps.
Polymer B is a 15% AMPS, 15% acrylic acid, 70% acrylamide terpolymer (30.8% polymer emulsion) with a Brookfield viscosity of 3.2 cps.
Polymer C is a 30% acrylic acid, 70% acrylamide copolymer (25% polymer emulsion) with a Brookfield viscosity of 5.8 cps.
Polymer D is a 15.9% AMPS, 84.1% acrylamide copolymer (85% active solid) with a Brookfield viscosity of 3.7 cps.

I claim:

1. A process for flocculating suspended solids which comprises adding to an aqueous suspension of solids selected from the group consisting of phosphate slime, uranium acid leach residue, copper acid leach residue, coal, coal refuse, and copper tailing from a flotation circuit an effective amount of a flocculant consisting essentially of a polymeric anionic flocculant wherein the polymeric anionic flocculant comprises from about 40 to about 99 mole percent of repeating units derived from acrylamide, from about 1 to about 35 mole percent of repeating units derived from 2-acrylamido-2-methylpropanesulfonic acid, and from 0 to about 25 mole percent of repeating units derived from acrylic acid, and wherein the polymeric anionic flocculant has a Brookfield viscosity of at least about 2.0 centipoises.

2. The process of claim 1 wherein the polymeric anionic flocculant employed comprises about 97 to 75 mole percent of repeating units derived from acrylamide, about 3 to 15 mole percent of repeating units derived from 2-acrylamido-2-methylpropanesulfonic acid and from 0 to 10 mole percent of repeating units derived from acrylic acid.

3. The process of claim 1 wherein the Brookfield viscosity is at least 3.30 centipoises.

4. The process of claim 1 wherein the polymeric anionic flocculant employed comprises about 97 to 85 mole percent of repeating units derived from acrylamide, about 3 to 15 mole percent of repeating units derived from 2-acrylamido-2-methylpropanesulfonic acid and from 0 to 10 mole percent of repeating units derived from acrylic acid and has a Brookfield viscosity of at least 3.30 centipoises.

5. A process for flocculating suspended solids which comprises adding to an aqueous suspension of phosphate slime solids an effective amount of a flocculant consisting essentially of a polymeric anionic flocculant wherein the polymeric anionic flocculant comprises from about 40 to about 99 mole percent of repeating units derived from acrylamide, from about 1 to about 35 mole percent of repeating units derived from 2-acrylamido-2-methylpropanesulfonic acid, and from 0 to about 25 mole percent of repeating units derived from acrylic acid, and wherein the polymeric anionic flocculant has a Brookfield viscosity of at least about 2.0 centipoises, flocculating solids causing them to settle and compacting the settled flocs to produce an underflow of flocculated material with a solids content greater than that of the suspension of solids.

6. The process of claim 5 wherein the polymeric anionic flocculant employed comprises about 97 to 85 mole percent of repeating units derived from acrylamide, about 3 to 15 mole percent of repeating units derived from 2-acrylamido-2-methylpropanesulfonic acid and from 0-10 mole percent of repeating units derived from acrylic acid.

* * * * *